US012226969B2

(12) United States Patent
Jaroszewicz

(10) Patent No.: US 12,226,969 B2
(45) Date of Patent: Feb. 18, 2025

(54) MOLD SEGMENT FOR TIRE HAVING CONNECTED FIRST AND SECOND SIPE ELEMENTS

(71) Applicant: Compagnie Generale des Etablissements Michelin, Clermont-Ferrand (FR)

(72) Inventor: Marcin Jaroszewicz, Olsztyn (PL)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 735 days.

(21) Appl. No.: 17/311,569

(22) PCT Filed: Dec. 16, 2019

(86) PCT No.: PCT/IB2019/060867
§ 371 (c)(1),
(2) Date: Jun. 7, 2021

(87) PCT Pub. No.: WO2020/128798
PCT Pub. Date: Jun. 25, 2020

(65) Prior Publication Data
US 2022/0024165 A1  Jan. 27, 2022

Related U.S. Application Data

(60) Provisional application No. 62/781,978, filed on Dec. 19, 2018.

(51) Int. Cl.
*B29D 30/06* (2006.01)

(52) U.S. Cl.
CPC .. *B29D 30/0606* (2013.01); *B29D 2030/0613* (2013.01)

(58) Field of Classification Search
CPC ............ B29D 30/0613; B29D 2030/061
See application file for complete search history.

(56) References Cited

U.S. PATENT DOCUMENTS

| 2018/0147748 A1 | 5/2018 | Jenkins et al. |
| 2018/0162016 A1 | 6/2018 | Reeb et al. |
| 2019/0389164 A1 | 12/2019 | Massis et al. |

FOREIGN PATENT DOCUMENTS

| JP | 2002096200 A | | 4/2002 |
| KR | 100551880 | * | 2/2006 |
| WO | 2019224479 A1 | | 11/2019 |

OTHER PUBLICATIONS

Yasuyuki. JP2002096200. 2005. ESpaceNet Translation. (Year: 2024).*

(Continued)

*Primary Examiner* — Katelyn W Smith
*Assistant Examiner* — Alexander D Booth
(74) *Attorney, Agent, or Firm* — Neal P. Pierotti

(57) ABSTRACT

A mold segment for forming a tire is provided that has a first sipe element (12) with a narrow section (14) and a teardrop section. The first sipe element has a female connector (18). A second sipe element (20) is present that has a narrow section (22) and a teardrop section. The second sipe element has a male connector (26). A mold segment base is present that receives the first sipe element and the second sipe element, and the female connector of the first sipe element receives the male connector of the second sipe element.

12 Claims, 8 Drawing Sheets

(56) References Cited

OTHER PUBLICATIONS

An Hyung. KR100551880. 2006. ESpaceNet Translation. (Year: 2024).*
European Patent Office, International search report dated Feb. 24, 2020, pp. 1-10 (included), European Patent Office, Rijswijk, Netherlands.
European Patent Office, International search report dated Aug. 28, 2020, pp. 1-9 (included), European Patent Office, Rijswijk, Netherlands.

* cited by examiner

MOLD SEGMENT FOR TIRE HAVING CONNECTED FIRST AND SECOND SIPE ELEMENTS

CROSS-REFERENCE TO RELATED APPLICATIONS

The present application is a 35 U.S.C. § 371 application of PCT/US19/060867 filed on Dec. 16, 2019 and entitled "Mold Segment for Tire Having Connected First and Second Sipe Elements." PCT/US19/060867 claims priority to U.S. Provisional Patent Application No. 62/781,978 filed on Dec. 19, 2018. PCT/US19/64703 and U.S. Provisional Application No. 62/781,978 are incorporated by reference herein in their entireties for all purposes.

FIELD OF THE INVENTION

The present invention relates generally to a mold segment for the formation of tires. More particularly, the present application involves a mold segment that features first and second sipe elements that can be received onto one another to result in a teardrop longitudinal sipe with no or minimized misaligned sections therein.

BACKGROUND

The production of tires includes the step of placing an uncured tire within a mold at which time heat and pressure is applied to the uncured tire in order to change its state to a cured condition. During the curing process, the uncured tire is placed inside of a metal mold that surrounds the exterior of the uncured tire. An expandable rubber bladder is positioned inside of the uncured tire, when it is within the mold, and is expanded to apply pressure to the inside surface of the uncured tire. The pressure applied by the expandable bladder forces the uncured tire against the mold to cause the uncured tire to be under pressure forces. Heat may be simultaneously applied, and the combination of heat and pressure applied for a particular time effects the curing process. The cured tire may then be removed from the mold and transported downstream for subsequent processing.

The expandable bladder when inflated and applying force causes the crown portion of the tire to be forced against a garniture of the mold that includes a series of features that form grooves, sipes, and tread blocks of the tire to result in the formation of the tread design of the tire. The garniture can be made of two or more multiple sections that are arranged in a circle. A production mold segment 74 is shown in FIG. 1 and features that are used to form the architecture of the tread are shown. In forming a teardrop longitudinal sipe of the tread, a series of sipe sections are present in the production mold segment 74. A first sipe element 94 is located next to a second sipe element 96 which is likewise located next to a third sipe element 98. The sipe elements 94, 96, 98 are not completely aligned next to one another. For example, a misalignment 100 exists between the first and second sipe elements 94, 96 such that the teardrop forming portions of these elements 94, 96 are out of alignment by the misalignment 100. The other portions of the sipe elements 94, 96 can likewise be misaligned, and it is also the case that the portions of the second and third sipe elements 96, 98 are likewise misaligned to one another. Molding of the tire with the misaligned sipe elements 94, 96, 98 causes the resulting teardrop longitudinal sipe in the tire to have sections that are stepped and otherwise misaligned. The misalignments may be in the teardrop sections or the narrow portions or both of the teardrop longitudinal sipe. As multiple production mold segments 74 are present in the garniture, if all or a portion of them include misaligned sipe elements then multiple steps and misalignments are present within the final teardrop longitudinal sipe. This may cause poorer hydrodynamical behavior for the tire.

In order to form the production mold segment 74, the casting process employs a gypsum/plaster cast segment that includes the sipe elements 94, 96, 98. In order to form the gypsum cast segment, a flexible cast segment is used and into this flexible cast segment the sipe elements 94, 96, 98 are inserted. The sipe elements 94, 96, 98 are aligned next to one another for use in forming the teardrop longitudinal sipe in the tire. The sipe elements 94, 96, 98 may not be placed precisely in alignment with one another and their positions may shift during the subsequent casting processes into which the sipe elements 94, 96, 98 are transferred to the gypsum cast segment and the production mold segment 74. Misalignment of the sipe elements 94, 96, 98 in the casting process results in a teardrop longitudinal sipe in the tire that has irregularities. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
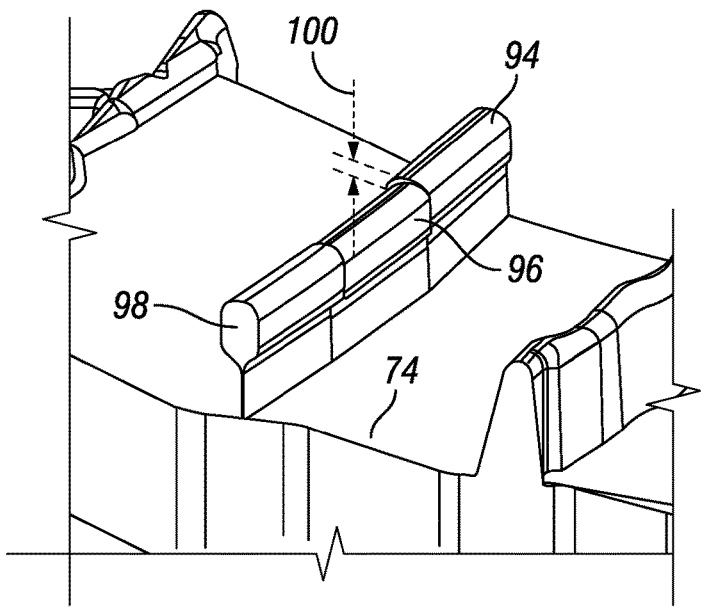
FIG. 1 is a perspective view of a prior art production mold segment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

A mold segment 10 is provided that has a first sipe element 12 and a second sipe element 20 that feature male and female connectors 26, 18. The male and female connectors 26, 18 can be engaged to cause the sipe elements 12, 20 to be connected to one another when placed into the mold segment 10. The positions of the sipe elements 12, 20 will be maintained during the different steps of the casting process to keep teardrop sections 16, 24 of the sipe elements 12, 20 aligned so that the resulting production mold segment 74 will have aligned teardrop sipe architecture.

Figure 2:
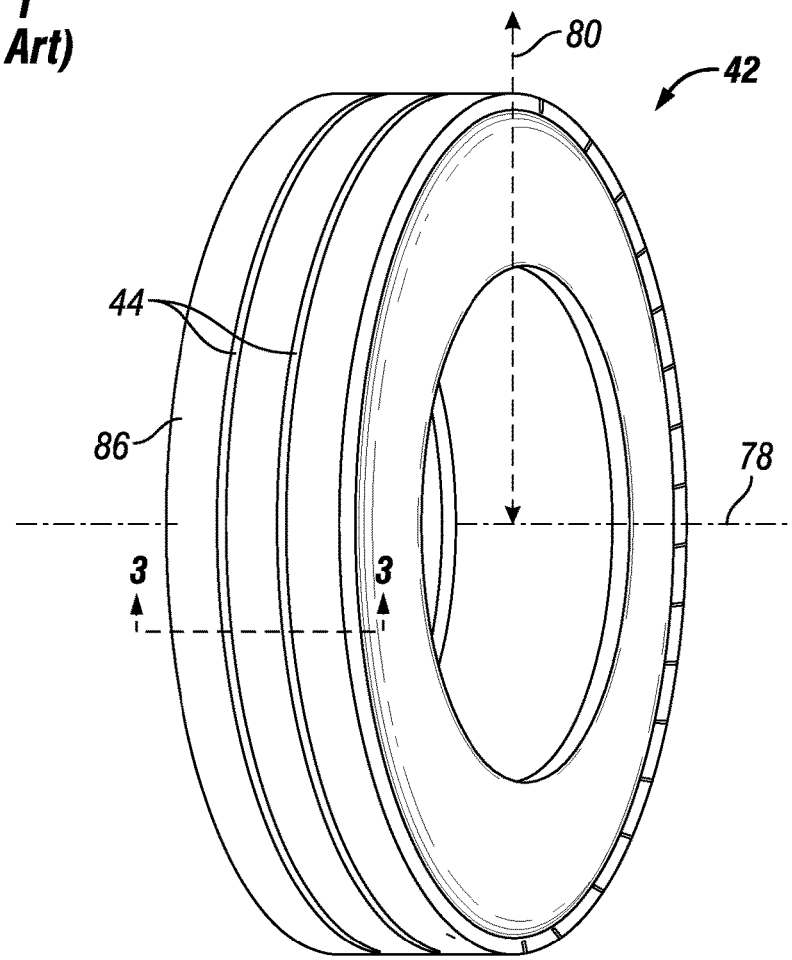
FIG. 2 is a perspective view of a tire.

With reference to FIG. 2, a tire 42 is illustrated in perspective view that has a central axis 78 that serves as the axis of rotation of the tire 42. The central axis 78 extends through the center of the tire 42 and is aligned in the axial direction. The radial direction 80 of the tire 42 extends outward from the central axis 78 and is perpendicular to the central axis 78. The tire 42 also has a circumferential direction that extends around the circumference of the tire 42 and circles the central axis 78. The circumferential direction may be located at any distance from the central axis 78 in the radial direction 80 of the tire 42, and need not be located only at the tread 86 or the outer most portion of the tire 42 in the radial direction 80. The tire 42 has tread 86 that may feature various tire architecture such as tread blocks, grooves, sipes, and ribs. The tread 86 shown has two teardrop longitudinal sipes 44 that extend around the entire circumference of the tread 86. In this regard, the teardrop longitudinal sipes 44 extend 360 degrees around the central axis 78. Although not shown in FIG. 2, other tire architecture of the tread shown could include lateral sipes that are located in the three sections formed by the shoulder edges of the tread 86 and the two teardrop longitudinal sipes 44. A sipe is defined as a groove of the tread 86 that has a width that is 2 millimeters or less. The grooves of the tread 86 may thus be grooves that have widths that are greater than 2 millimeters. The widths of the sipes can be measured at the surface of the tread 86 when the tread 86 is new and not worn, as in some instances the teardrop sections of the sipes, if they have them, may in fact be larger than 2 millimeters. Although no grooves are shown, it is to be understood that in other arrangements they may be present. The sipes and grooves can take on any shape and extend in any direction such as angled, curved, or zig-zag. Although two teardrop longitudinal sipes 44 are shown, it is to be understood that the mold segment 10 that is used to form the tire 42 may be arranged to form only a single teardrop longitudinal sipe 44 in other embodiments. As such, the mold segment 10 may be used to form a tire with one or more teardrop longitudinal sipes 44 with any other tread 86 architecture such as additional sipes, grooves, ribs, etc. A pair of sidewalls extend from the crown of the tire 42 on either side in the axial direction 78 towards the center in the radial direction 80. Depending upon the tire 42 geometry, some features of the tread 86, such as lateral sipes (if present) and grooves, may extend into the sidewalls as well.

Figure 3:
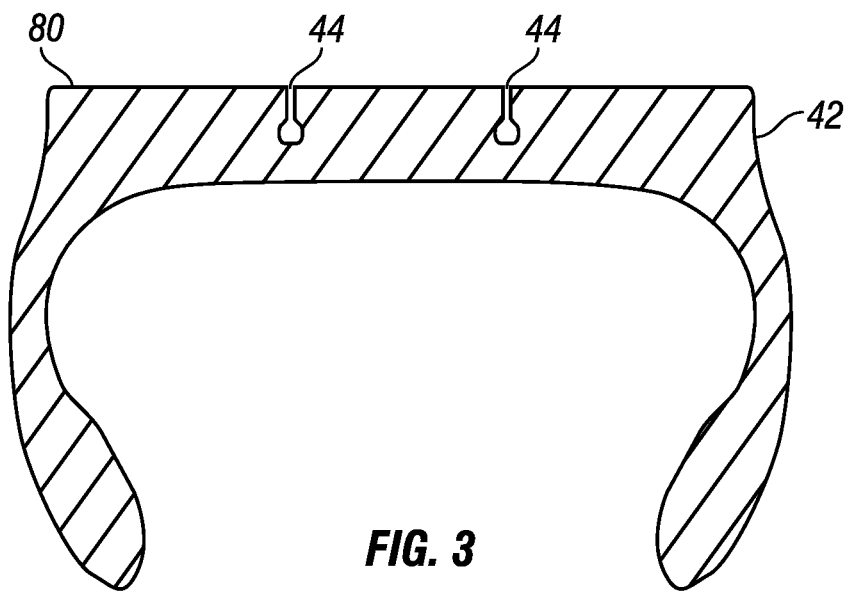
FIG. 3 is cross-sectional view taken along line 3-3 of FIG. 2.

FIG. 3 is a cross-sectional view taken along line 3-3 of FIG. 2 and shows the cross-sectional shapes of the teardrop longitudinal sipes 44. Although not shown in the illustrated embodiment, the lateral sipes could be small cuts in the tread that maintain the same cross-sectional profile along their entire depth, although this need not be the case in other embodiments. The teardrop longitudinal sipes 44 have a narrow section less than 2 millimeters extending from the surface of the tread 86 into the tread. The teardrop longitudinal sipes 44 then at the bottom of this narrow section open up into a larger void that is wider, and in some cases may be greater than 2 millimeters, than the narrow section. The shape of this larger void can be round, rectangular, oval, or of any shape. When new, this larger void is hidden from view as it is within the interior of the tread 86. Wear of the tread 86 causes the rubber to be worn off until the larger void is exposed and imparts desired properties onto the performance of the tread 86 during use.

Figure 4:
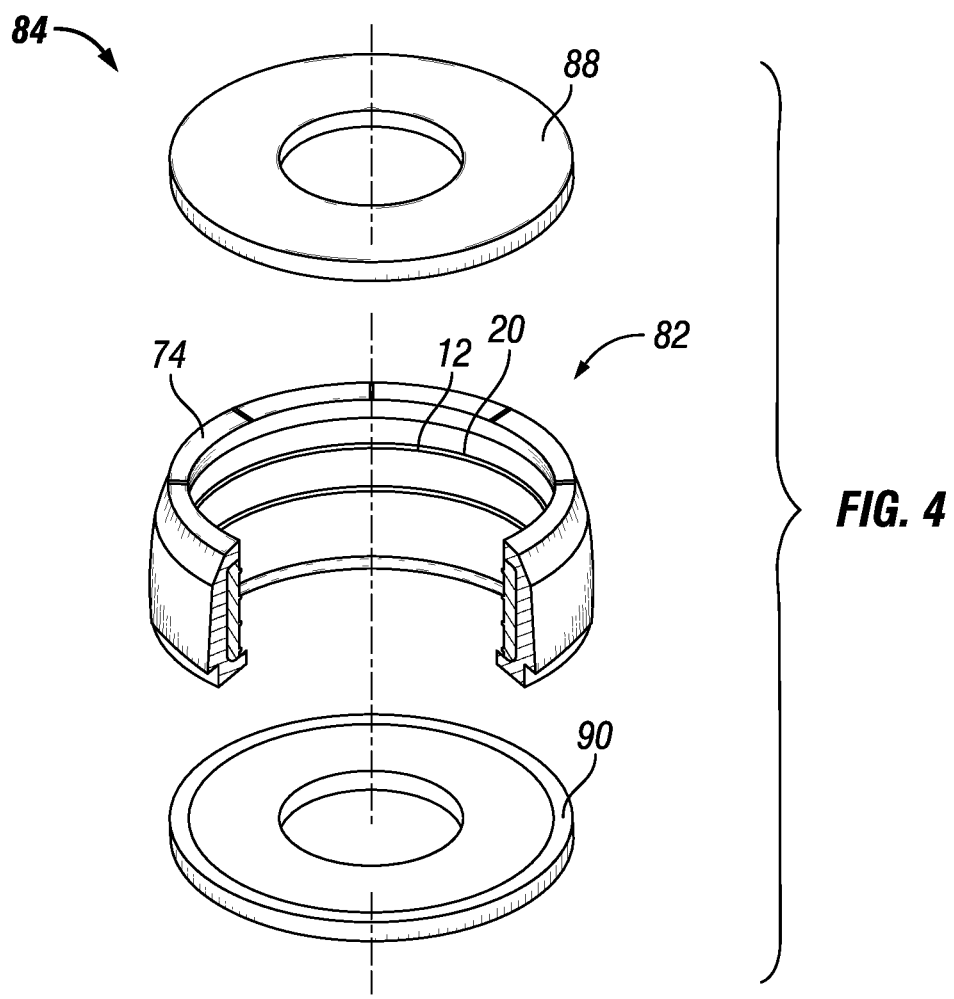
FIG. 4 is an exploded perspective view of a mold.

FIG. 4 shows a mold 84 for curing a tire 42. A tire 42 that is made of uncured rubber is placed into the mold 84 and cured via heat and pressure applied by the mold 84. The mold 84 can be configured in a variety of ways. In the embodiment illustrated, the mold 84 includes a garniture 82 that has a series of production mold segments 74 that engage the tire 42 to form the tread 86 of the tire 42. The mold 84 also includes a top mold section 88 and a bottom mold section 90 that engage the sidewalls of the tire 42 and form the sidewall portions. In other arrangements, additional top and bottom mold sections 88, 90 can be included and thus multiple other components may be present in the mold 84 for forming the tire 42. The green/unmolded tire 42 can be placed inside of the garniture 82 and the top and bottom mold sections 88, 90 may be moved into engagement with the garniture 82. An inflatable bladder is placed through one of the sections 88, 90 and inside of the tire 42 and is inflated in order to press the tire 42 against the tread producing elements of the production mold segments 74 and against the insides of the top and bottom mold sections 88, 90. Heating elements can be located within the various production mold segments 74 or they may be otherwise heated in order to transfer heat into the tire 42 that is within in the mold 84. In this manner, the mold 84 is capable of applying heat and pressure to the tire 42 that is within the mold 84. Although described as all being moveable, it may be the case that some of the elements production mold segments 74 are not movable while others are in fact movable to open and close the mold 84. The production mold segments 74 may be movable in that they move relative to the ground onto which the mold 84 rests.

The bladder can be inflated with air, steam, liquid, nitrogen, or any other fluid to cause it to expand to force the tire 42 against the tread and sidewall forming portions of the mold 84. After sufficient heat and pressure are applied to the tire 42 for a sufficient amount of time, the bladder can be deflated and the top and/or bottom mold sections 88, 90 can be moved away from the garniture 82 to allow the cured tire 42 to be removed for subsequent processing.

Figure 5:
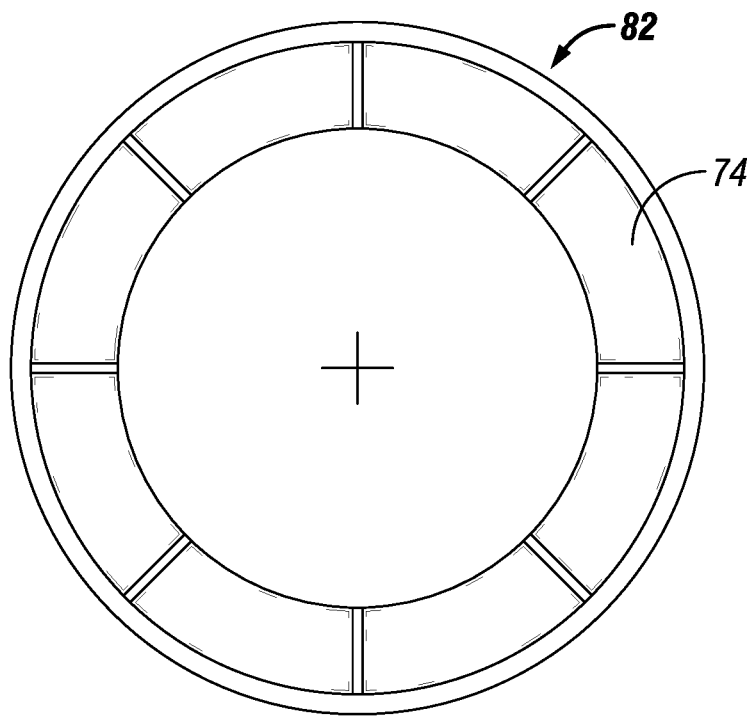
FIG. 5 is a top view of a garniture.

With reference to FIG. 5, the garniture 82 of the mold 84 is made of a plurality of production mold segments 74 that extend 360 degrees about an axis. The production mold segments 74 may be in engagement with one another, or a small space could be present between the production mold segments 74. In some arrangements, the production mold segments 74 can move in the radial direction towards the central axis to further add pressure to the tire 42 during curing. In other instances, the production mold segments 74 are stationary and do not move in the radial direction. The production mold segments 74 can be the same size as one another, or may be different sizes from one another. Although 8 production mold segments 74 are shown, it is to be understood that the garniture 82 can include any number of production mold segments 74 in other arrangements. For example, from 9-12 production mold segments 74 can be included in the garniture 82 in other versions of the mold 84. Still further, although described as having production mold segments 74, the garniture 82 could in fact be composed of zero production mold segments 74 in other arrangements in which the garniture 82 is a single, solid piece that extends around its central axis. The production mold segments 74 thus engage the tire 42 during formation, and include the various sipe elements such as the first sipe element 12 and the second sipe element 20 that are used to form the teardrop longitudinal sipe 44 of the tire 42 upon molding by the mold 84.

In order to make the production mold segment 74, the mold making process can employ a gypsum cast segment that includes embedded in it sipe making elements and those used to make the teardrop longitudinal sipe 44 such as the first and second sipe elements 12, 20. The first and second sipe elements 12, 20 are embedded into the production mold segment 74 so that the teardrop sections 16, 24 are more into the gypsum and the narrow sections 14, 22 extend more out of and away from the gypsum. The gypsum cast segment also has various features that are imparted into the production mold segment 74 such as grooves, ribs, and shoulder features. The gypsum cast segment is a positive image of the tread 86. Hot aluminum is poured onto the gypsum cast segment which then hardens and takes on the features of the gypsum cast segment and the exposed pieces such as the sipe making elements are embedded into the production mold segment 74. The narrow sections 14, 22 may be those that are embedded into the production mold segment 74. The gypsum may be machined off as desired in order to complete the production mold segment 74.

Figure 6:
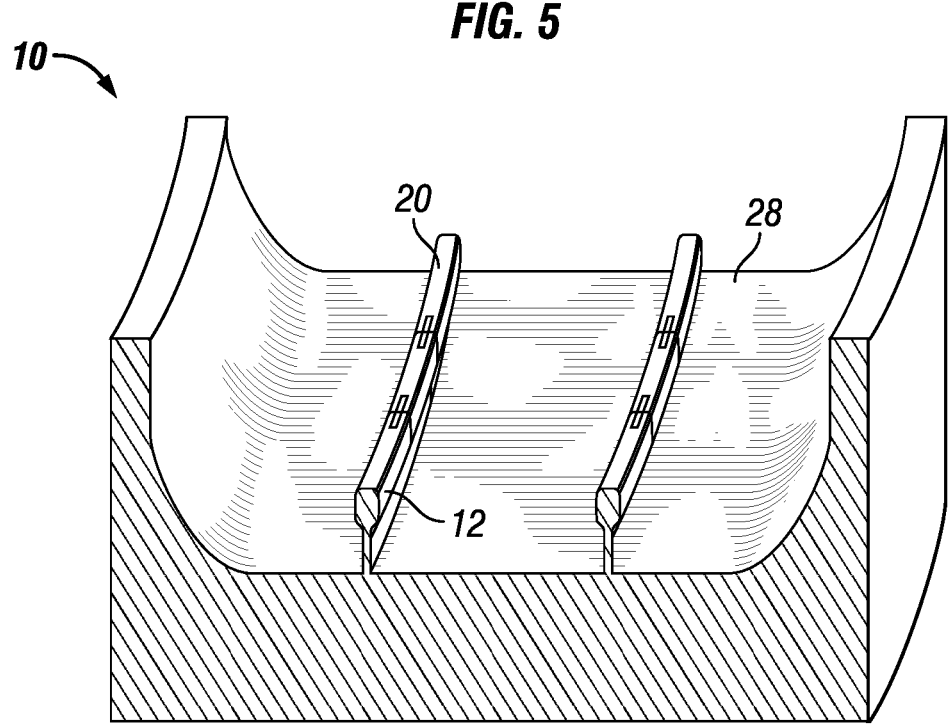
FIG. 6 is a perspective view of a mold segment.
Figure 7:
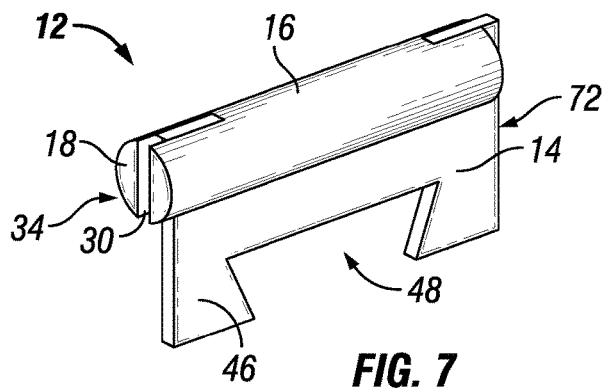
FIG. 7 is a perspective view of a first sipe element.
Figure 8:
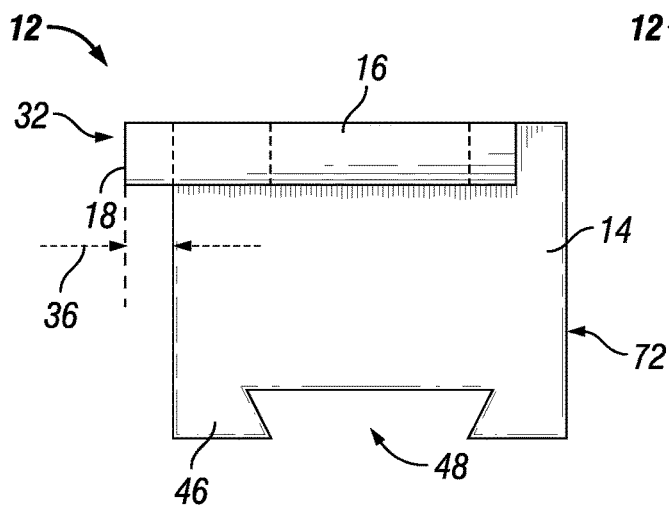
FIG. 8 is a front view of the first sipe element of FIG. 7.
Figure 9:
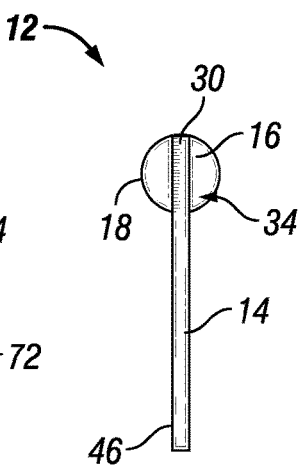
FIG. 9 is a left side view of the first sipe element of FIG. 7.
Figure 10:
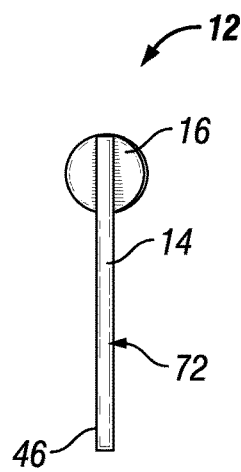
FIG. 10 is a right side view of the first sipe element of FIG. 7.
Figure 11:
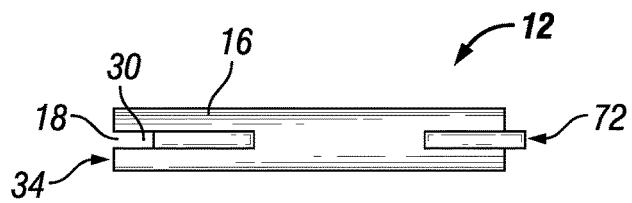
FIG. 11 is a top view of the first sipe element of FIG. 7.

In order to create the gypsum cast segment, the molding process may use a mold segment 10, one example of which is illustrated with reference to FIG. 6. The mold segment 10 has some flexibility in it and may sometimes be referred to as a flexible cast segment 10. The mold segment 10 may be made out of castable mold rubber such as polysulfide rubber. The mold segment 10 has a mold segment base 28 and it is this base 28 that can include the polysulfide rubber and be somewhat flexible. The various features in the mold segment base 28 that form the architecture of the tread 86 can be made out of the flexible material. Additionally, the first and second sipe elements 12, 20 can be placed into the mold segment base 28 at this stage of the production process, and these first and second sipe elements 12, 20 may be eventually transferred to the production mold segment 74 and engage the tire 42 to form the teardrop longitudinal sipe 44 during curing. The first and second sipe elements 12, 20 are pushed into the flexible mold segment base 28 and held therein by the gripping force of the flexible mold segment base 28. The first and second sipe elements 12, 20 are interlocked with one another via a connection described herein so that their position relative to one another remains constant and does not vary during the production process. The mold segment 10 features three sipe elements interlocked with one another and pressed into the mold segment base 28. An additional three interlocked sipe elements are next to these three to form the adjacent teardrop longitudinal sipe 44. Although three interlocked sipe elements are disclosed, any number of two or more sipe elements can be present in the mold segment base 28. As the mold segment base 28 may be curved for forming the eventual curved surface section of the tire 42, the sipe elements can be arranged so that they are interlocked not linearly but instead have some angled arrangement to accommodate some or all of the curvature of the mold segment base 28. The sipe elements 12, 20 inserted into the mold segment base 28 may engage it only at the bottom, or various feature forming portions of the mold segment base 28 can touch the sipe elements 12, 20 on their sides as well. The sipe elements 12, 20 are arranged into the mold segment base 28 so that narrow sections 14, 22 extend out of the mold segment base 28 and the teardrop sections 16, 24 are farther away from this point of extension.

FIGS. 7-11 illustrate a first sipe element 12 in accordance with one exemplary embodiment. The first sipe element 12 can be made out of a rigid material such as steel or aluminum, and may include a relatively flat first sipe element narrow section 14 that is used to form the narrow sipe section of the teardrop longitudinal sipe 44. At the bottom of the first sipe element narrow section 14, a first sipe element embedded end 46 is present and has a first sipe element void 48. The first sipe element embedded end 46 is pressed into the mold segment base 28 and buried therein when forming the mold segment 10, and the first sipe element narrow section 14 can remain exposed. The first sipe element void 48 may be dovetail in shape, but can be variously shaped in other exemplary embodiments. The first sipe element embedded end 46 may be integrally formed with the first sipe element narrow section 14. The first sipe element 12 also includes a first sipe element teardrop section 16 located at an end of the first sipe element narrow section 14. The first sipe element teardrop section 16 is the portion of the first sipe element 12 used to form the teardrop portion of the teardrop longitudinal sipe 44 and is wider than the first sipe element narrow section 14.

The first sipe element teardrop section 16 is offset from the first sipe element narrow section 14 in the length direction, and is not movable relative to the first sipe element narrow section 14. The first sipe element 12 has a first terminal end 34 which is the farther portion of the first sipe element 12 in one direction. The first sipe element teardrop section 16 is located at the first terminal end 34, and the first sipe element narrow section 14 is not located at the first terminal end 34. The first sipe element teardrop section 16 is offset from the first sipe element narrow section 14 such that an offset 36 is measured from the first terminal end 34 to the first sipe element narrow section 14. On the opposite side, the first sipe element 12 has a first sipe element second terminal end 72 and the first sipe element narrow section 14 is located at the first sipe element second terminal end 72. The first sipe element teardrop section 16 is spaced from and is not located at the first sipe element second terminal end 72. In some embodiments, the offset 36 is one millimeter.

Figure 12:
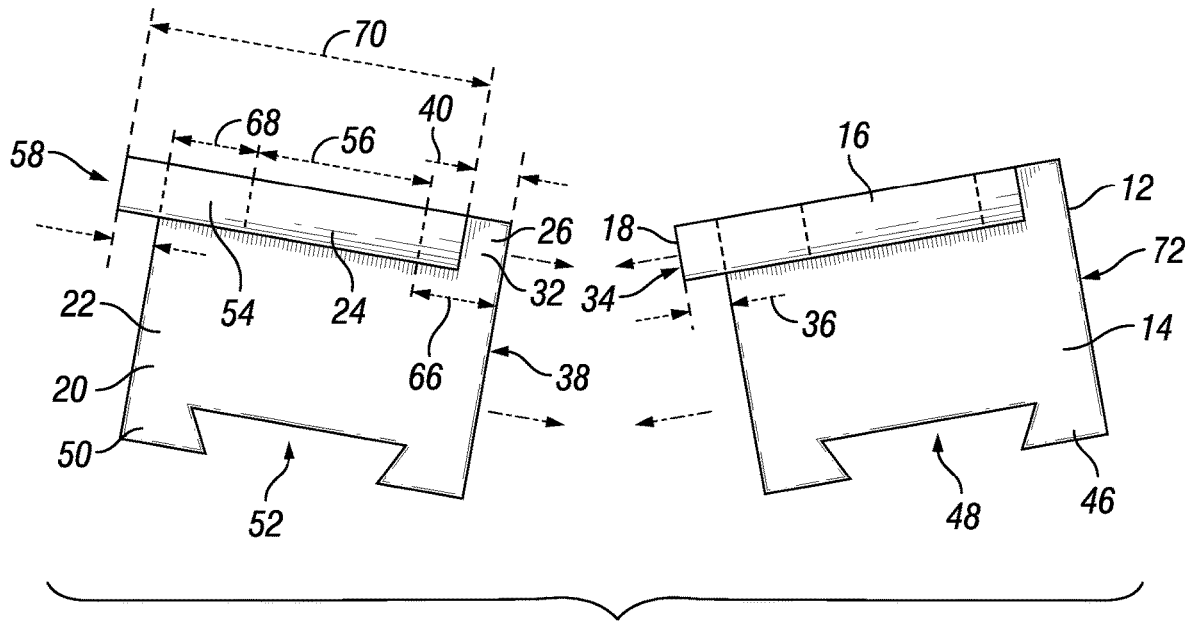
FIG. 12 is a front view of first and second sipe element unengaged.

The first sipe element 12 has a female connector 18 located at the first terminal end 34. The female connector 18 is formed by a slot 30 defined in the first sipe element teardrop section 16 and the slot 30 is a vertical slot that extends completely through the first sipe element teardrop section 16 and extends the same distance as the offset 36 into the first sipe element teardrop section 16. FIG. 12 shows the first sipe element 12 spaced from and not in engagement with a second sipe element 20. The second sipe element 20 can be arranged the same way as the first sipe element 12 and the previous description of the first sipe element 12 may be applied to the second sipe element 20. In this regard, the second sipe element 20 has a second sipe element embedded end 50 that with a second sipe element narrow section 22 defines a second sipe element void 52. The second sipe element teardrop section 24 has a length 70, and in some instances the length 70 is the same as the length of the second sipe element narrow section 22. The second sipe element 20 has a first terminal end 38 at which the second sipe element narrow section 22 is located. An oppositely disposed second terminal end 58 of the second sipe element 20 is present and the second sipe element teardrop section 24 is located at the second terminal end 58. The teardrop sections 16, 24 may be connected to the other portions of the sipe elements 12, 20 by any manner such as crimping, welding, brazing, mechanical fasteners, or integral formation. This connection may be permanent, or it may be a removable connection.

The second sipe element teardrop section 24 is offset 40 from the first terminal end 38 and the second sipe element teardrop section 24 is not located at the first terminal end 38. The second sipe element 20 has a first leg 32 and a second leg 54 that are spaced from one another a distance 56. The legs 32, 54 are integrally formed with the second sipe element narrow section 22 and may be of the same width as the second sipe element narrow section 22. A void exists between the legs 32, 54 in the length direction. The first leg 32 has a length 66 in the longitudinal direction, and the second leg 54 has a length 68 in the longitudinal direction. The lengths 66 and 68 may be the same in some embodiments. The second sipe element 20 has a male connector 26 located at the first terminal end 38. The male connector 26 is composed of the first leg 32 and is that portion of the first leg 32 that is exposed via the offset 40. In accordance with some exemplary embodiments regarding the second sipe element 20, the length 66 must be at a minimum 4 millimeters, and the length 68 must be at a minimum 4 millimeters, and the length 56 between the two legs 32 and 54 must be at least 16 millimeters. In some exemplary embodiments, the offset 40 is one millimeter, and the offset 36 is one millimeter.

Figure 13:
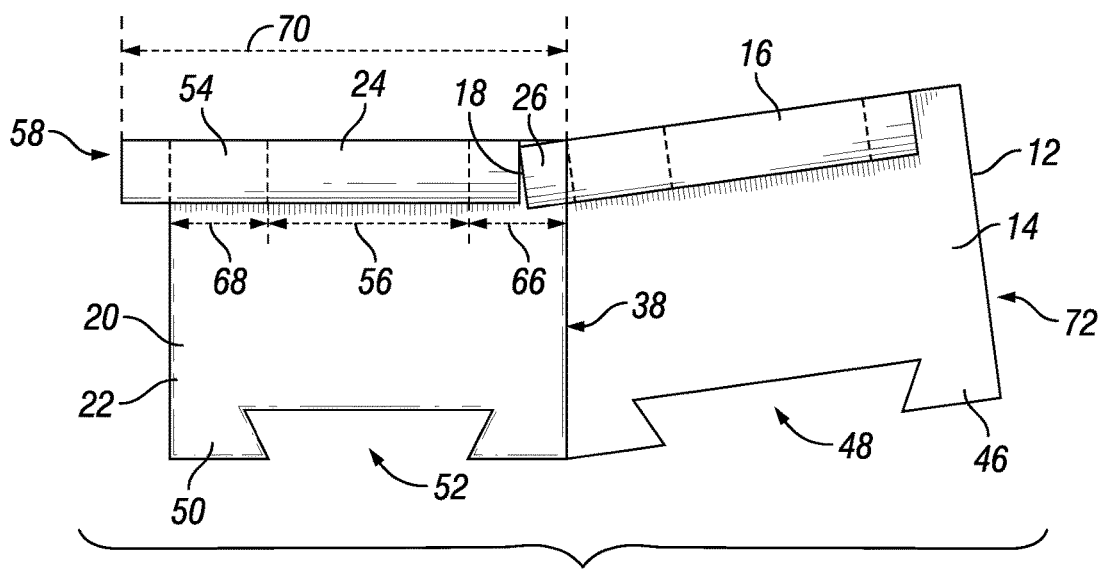
FIG. 13 is a front view of the first and second sipe elements of FIG. 12 engaged.

The female connector 18 and male connector 26 can be engaged with one another to lock the position of the first sipe element 12 to the second sipe element 20. FIG. 13 shows the two sipe elements 12, 20 moved into engagement with one another so that the female connector 18 engages the male connector 26. Although the two can be separated by pulling them apart, the elements 12, 20 are described as connected because through their engagement they cannot move in at least some directions such as closer to one another, or to the left or right of one another. Engagement of the two sipe elements 12 and 20 allows them to be inserted into the mold segment base 28 so that their relative positions to one another will not change during the mold 84 building process. By maintaining their relative positions, the resulting production mold segment 74 will have features for forming the teardrop longitudinal sipe 44 that are more closely aligned with one another so that steps are eliminated or reduced.

Figure 14:
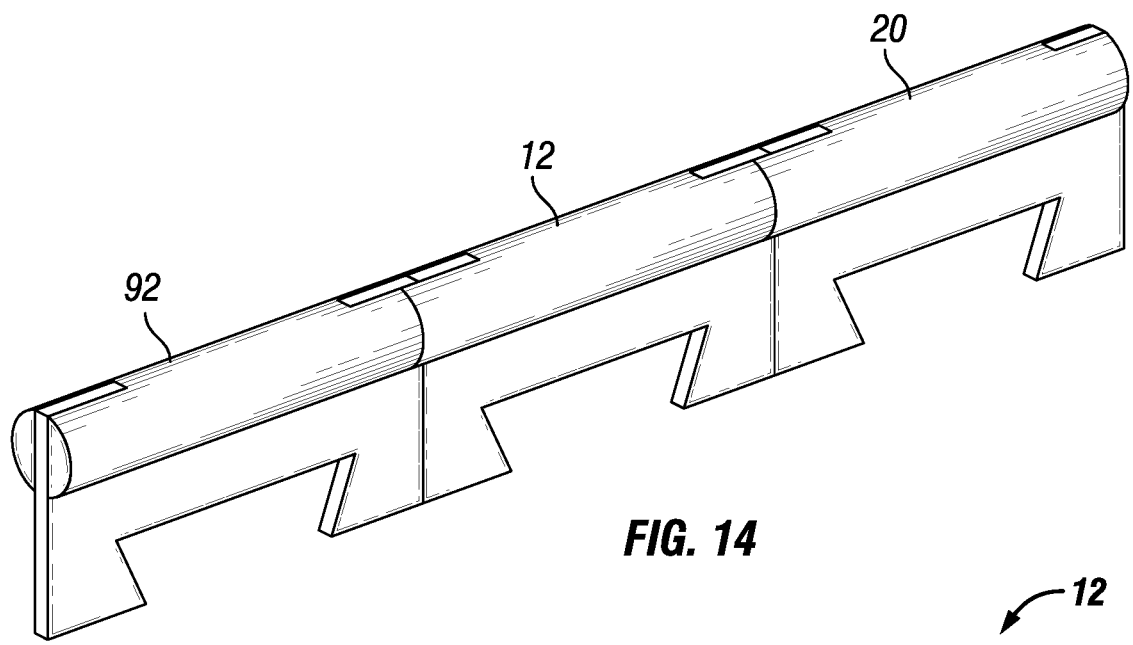
FIG. 14 is a perspective view of three sipe elements engaged with one another.

The connection results from moving the first leg 32 of the second sipe element 20 into the slot 30 of the first sipe element teardrop section 16. The first leg 32 is sized relative to the slot 30 so that it is tightly received therein. The offset 40 distance is the same as the distance of offset 36 so that the first terminal end 38 engages the first sipe element narrow section 14. The second sipe element teardrop section 24 engages the first sipe element teardrop section 16 when the female and male connectors 18, 26 are connected. The geometry of the first terminal end 38, the end of the second sipe element teardrop section 24, the first terminal end 34, and/or the first sipe element narrow section 14 can be arranged so that the first and second sipe elements 12, 20 are angled relative to one another when the connecters 18, 26 are engaged as shown in FIG. 13. Alternatively, the geometry can be arranged so that the first and second sipe elements 12, 20 when connected are not angled relative to one another but are parallel to one another. The angled arrangement may allow the connected sipe elements 12, 20 to better conform to the concave curvature of the mold segment base 28 when forming the round section of the tire 42. FIG. 14 shows the first and second sipe elements 12, 20 connected and parallel to one another when connected. The drawing also shows a third sipe element 92 connected and parallel to the first sipe element 12. Male and female connectors 26, 18 can be present on opposite ends of the sipe elements so that two sipe elements can be connected thereto. Also, in some embodiments, the sipe element could have two male connectors 26 one opposite ends for connection to two sipe elements, or may have two female connectors 18 on opposite ends for connection to two sipe elements. When assembled as a network of sipe elements, each adjoining sipe element will have interconnections to the next to align them together.

Figure 15:
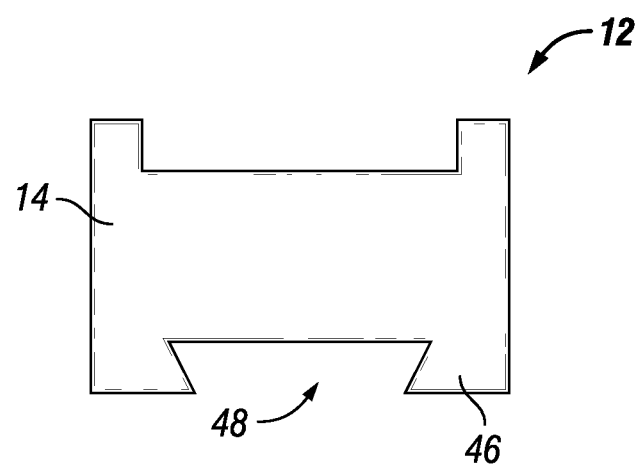
FIG. 15 is a front view of a portion of the first sipe element.
Figure 16:
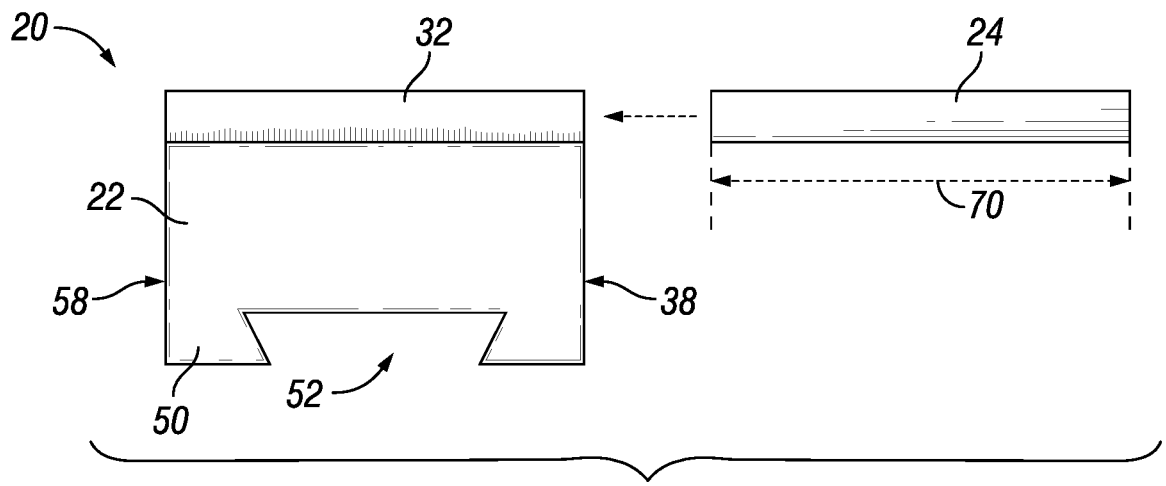
FIG. 16 is a front view of a second sipe element that has a single leg.

The sipe elements can be configured in a variety of different manners in accordance with other embodiments of the mold segment 10. The first sipe element narrow section 14 of the first sipe element 12 is shown in FIG. 15. The first sipe element void 48 has a dovetail shape and is at the end of the first sipe element 12 that includes the first sipe element embedded end 46. The void 48 need not be dovetail shaped in other embodiments. The opposite end includes a pair of the legs as previously discussed that are separated from one another by a distance such that a void is present between the legs. Although the legs are illustrated as being square in shape, they may be rectangular, circular, triangular, or variously shaped in accordance with other exemplary embodiments. A variation of the sipe element is shown in FIG. 16 in which the second sipe element 20 is illustrated that features but a single first leg 32. No other legs of the second sipe element 20 are present except for this single first leg 32 of the second sipe element 20. The single first leg 32 is located at both terminal ends 38, 58 such that it extends the entire length of the second sipe element 20. The second sipe element narrow section 22 likewise is located at the terminal ends 38, 58. The second sipe element teardrop section 24 can be retained onto the first leg 32 via any possible mechanism such as crimping, welding, integral formation, or mechanical fasteners. The length 70 can be the same as the length of the first leg 32, but the second sipe element teardrop section 24 can be offset from the first leg 32 so that a female connector 18 and male connector 26 are formed. Alternatively, the length 70 can be longer or shorter than the length of the first leg 32 so that at least one female connector 18 and/or male connector 26 are formed.

Figure 17:
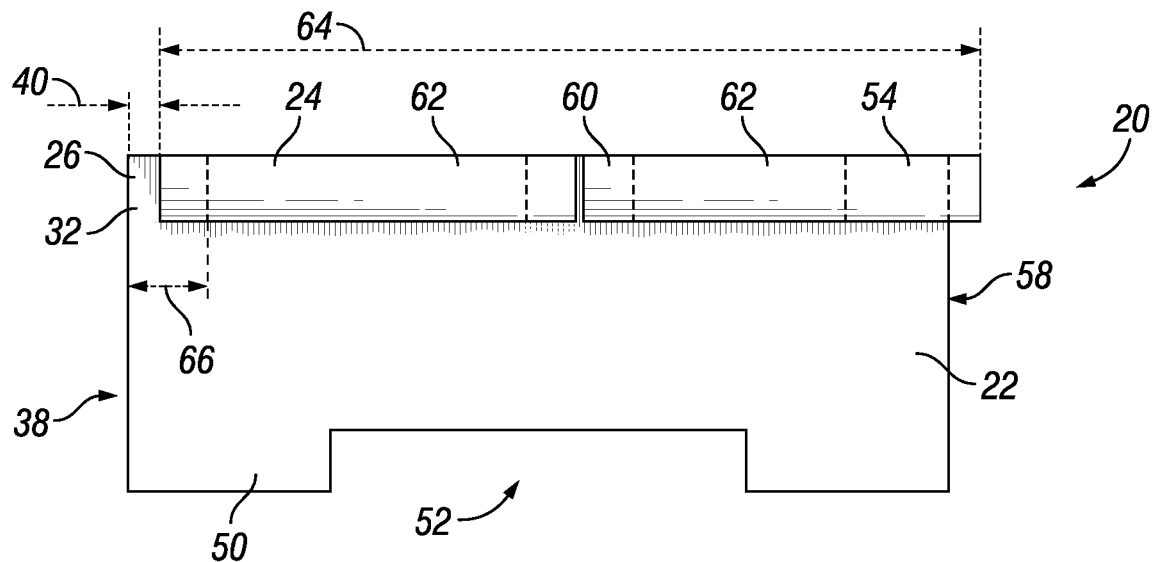
FIG. 17 is a front view of a second sipe element that has three legs and a pair of teardrop sections.

FIG. 17 shows another alternative exemplary embodiment of the second sipe element 20 that is different from those previously discussed in that a third leg 60 is present along with a pair of second sipe element teardrop sections 62 instead of just a single teardrop section. The third leg 60 is located between the first leg 32 and the second leg 54 in the length direction of the second sipe element 20. A void is present between the first leg 32 and the third leg 60, and a void is present between the third leg 60 and the second leg 54. The legs 32, 54, 60 may all be sized and shaped the same. The pair of second sipe element teardrop sections 62 includes two of the sections and they are both retained onto the three legs 32, 54, 60. A first one of the pair 62 engages the first leg 32 and the third leg 60, and a second one of the pair 62 engages the third leg 60 and the second leg 54. The pair 62 may abut one another so that a discontinuity is not formed in the resulting teardrop longitudinal sipe 44. The pair 62 has a length 64 that extends in the longitudinal direction of the second sipe element 20 which may be the same as the length of the second sipe element narrow section 22. The pair 62 can be offset 40 from the second sipe element narrow section 22 to form the male connector 26 as previously discussed. The pair 62 can be oriented linearly with respect to one another, or they can be slightly angled against one another to allow for some amount of curvature to be imparted into the to be molded teardrop section of the teardrop longitudinal sipe 44.

The sipe elements 12, 20 can be arranged so that the length 70 is from 8 millimeters to up to but not including 24 millimeters and so that a single leg 32, and no more than one, is present and a single teardrop section 16, 24, and no more than one, is present. Further, if such a sipe element 12, 20 is provided and the length 70 is 12 millimeters up to but not including 24 millimeters, then the length of the slot 30 which may be the offset 36 is equal to one third of the length 70. The sipe elements 12, 20 can be arranged so that two legs 32 and 54 are present and a single teardrop section 16, 24, and no more than one, is present and so that the length 70 is from 24 millimeters up to but not including 70 millimeters. In another embodiment, the sipe elements 12, 20 may be arranged so that three legs 32, 54, 60 are present, and a pair of the teardrop sections 62 are present, and so that the length 64 is 70 millimeters or greater.

Figure 18:
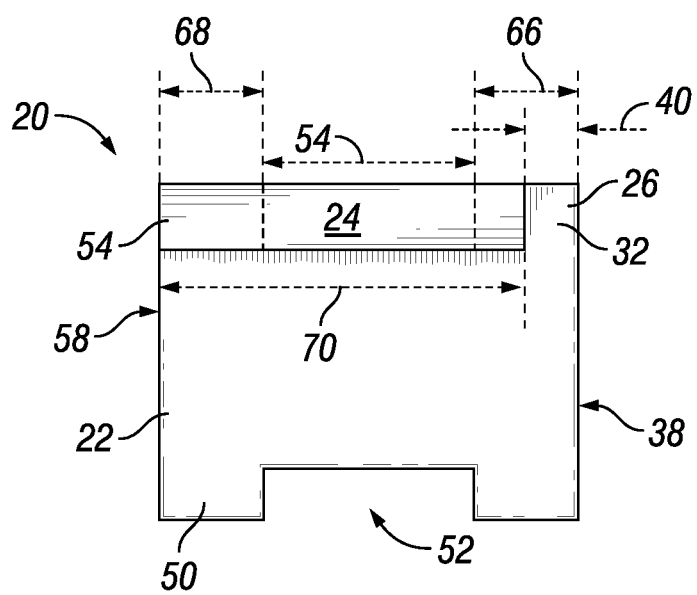
FIG. 18 is a front view of a second sipe element that has a male connector and no connector on its opposite end.

The sipe elements as discussed may include a female connector 18 on one end and a male connector 26 on an opposite end. However, variations are possible in which only one of the connectors 18 or 26 is present in the sipe element. FIG. 18 shows the second sipe element 20 with a male connector 26 on one end as previously discussed. A pair of legs 32, 54 are present, and the length 70 is less than the length of the second sipe element narrow section 22. In this regard, the second terminal end 58 has both the second sipe element narrow section 22 and the second sipe element teardrop section 24 located thereon. The second leg 54 is also located at the second terminal end 58. These three components 22, 54, and 24 end in a planar surface at the second terminal end 58. There is no female connector 18 or male connector 26 at the second terminal end 58. A second sipe element 20 of this configuration may be used at the end of a series of sipe elements disposed within the mold segment base 28. The third sipe element 92 of FIG. 14 likewise does not have a male or female connector 26, 18 located at one of its terminal ends.

Figure 19:
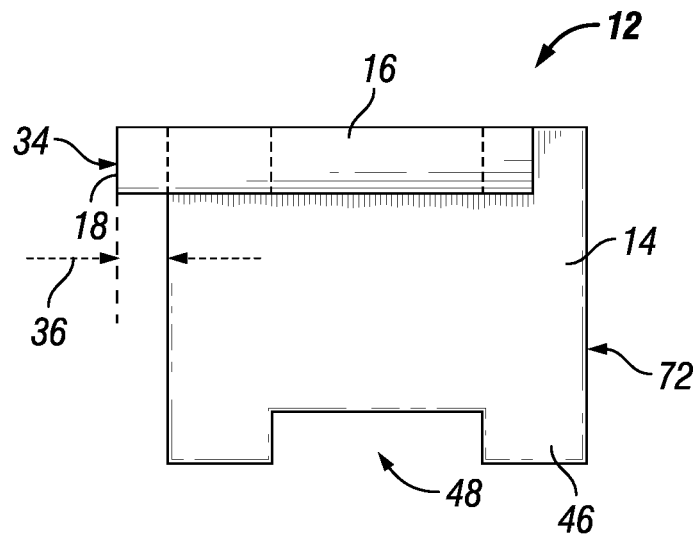
FIG. 19 is a front view of a first sipe element that has a female connector and no connector on its opposite end.

FIG. 19 illustrates an alternative exemplary embodiment in which the first sipe element 12 has a female connector 18 located at the first terminal end 34 as discussed in previous embodiments. The first sipe element second terminal end 72 does not have a male or female connector 26, 18. Instead, the various elements such as the first sipe element teardrop section 16, the narrow section, and the leg end at the first sipe element second terminal end 72 and may end in a plane in some embodiments. The length of the first sipe element teardrop section 16 can be longer than the length of the narrow section. As such, the sipe elements can be constructed so that only the female connector 18 is present and the male connector 26 is not present.

Figure 20:
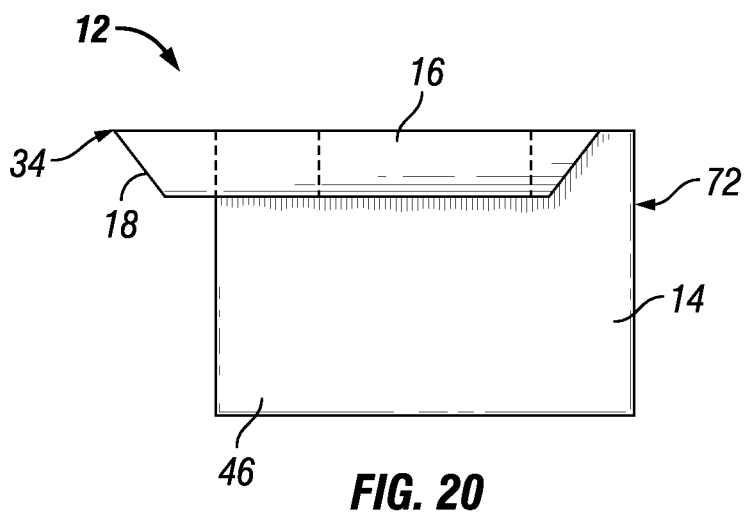
FIG. 20 is a front view of a first sipe element that has an angled teardrop section.

FIG. 20 shows a further exemplary embodiment in which the first sipe element 12 has a first sipe element narrow section 14 but does not have a void at the first sipe element embedded end 46. The first sipe element 12 does have a pair of legs on an end opposite the first sipe element embedded end 46. The first sipe element teardrop section 16 is offset from the first sipe element narrow section 14 in the longitudinal direction and male and female connectors can be defined on opposite ends of the first sipe element 12. The first sipe element teardrop section 16 has angled, or tilted, ends and not ends that are parallel or substantially parallel to the ends of the first sipe element narrow section 14. The first terminal end 34 is the location at the first sipe element teardrop section 16 located at a position farthest from the first sipe element embedded end 46. The length of the angled first sipe element teardrop section 16 illustrated is measured between the closer of the two points of the opposite ends of the angled first sipe element teardrop section 16.

The description of the mold segment 10 includes various illustrations and descriptions of different designs of the first sipe element 12 and the second sipe element 20. It is to be understood that this is for sake of convenience and that all design aspects associated with the first sipe element 12 could be associated with those of the second sipe element 20. Likewise, all design aspects of the second sipe element 20 could be associated with those of the first sipe element 12. The interlocked sipe elements 12, 20 may result in the elimination of visible steps in the tread of the tire 42.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A mold segment for forming a tire, comprising:
a first sipe element that has a first sipe element narrow section and a first sipe element teardrop section, wherein the first sipe element has a female connector;
a second sipe element that has a second sipe element narrow section and a second sipe element teardrop section, wherein the second sipe element has a male connector, wherein the male connector is located at a first terminal end of the second sipe element, wherein the second sipe element teardrop section is offset from the first terminal end of the second sipe element and not located at the first terminal end of the second sipe element; and
a mold segment base that receives the first sipe element and the second sipe element, wherein the female connector of the first sipe element receives the male connector of the second sipe element;
wherein the female connector is a slot defined in the first sipe element teardrop section, and wherein the male connector is a first leg of the second sipe element, wherein when the female connector of the first sipe element receives the male connector of the second sipe element the first leg is located within the slot;
wherein the first sipe element teardrop section is located at a first terminal end of the first sipe element, and wherein the first sipe element narrow section is offset from the first terminal end of the first sipe element and not located at the first terminal end of the first sipe element;
wherein the first leg is located at the first terminal end of the second sipe element, and wherein the second sipe element narrow section is located at the first terminal end of the second sipe element.

2. The mold segment as set forth in claim 1, wherein the mold segment base is made of polysulfide castable mold rubber, and wherein the first sipe element and the second sipe element are forced into the polysulfide castable mold rubber to be received therein, and wherein the first sipe element narrow section and the second sipe element narrow section are located closer to the mold segment base than are the first sipe element teardrop section and the second sipe element teardrop section.

3. The mold segment as set forth in claim 1, wherein the second sipe element has a second leg spaced a distance from the first leg of the second sipe element, wherein the second sipe element teardrop section engages both the first and second legs of the second sipe element.

4. The mold segment as set forth in claim 3, wherein the second sipe element has a second terminal end and wherein the second sipe element narrow section and the second sipe element teardrop section are both located at the second terminal end.

5. The mold segment as set forth in claim 3, wherein the first leg of the second sipe element is at least 4 millimeters in length, wherein the second leg of the second sipe element is at least 4 millimeters in length, and wherein the distance from the first leg of the second sipe element to the second leg of the second sipe element is at least 16 millimeters, and wherein the second sipe element has only a single one of the second sipe element teardrop section.

6. The mold segment as set forth in claim 1, wherein the first leg of the second sipe element is the only leg of the second sipe element at the second sipe element teardrop section, and wherein the second sipe element teardrop section is from 8 to less than 24 millimeters in length.

7. A mold segment for forming a tire, comprising:
- a first sipe element that has a first sipe element narrow section and a first sipe element teardrop section, wherein the first sipe element has a female connector;
- a second sipe element that has a second sipe element narrow section and a second sipe element teardrop section, wherein the second sipe element has a male connector, wherein the male connector is located at a first terminal end of the second sipe element, wherein the second sipe element teardrop section is offset from the first terminal end of the second sipe element and not located at the first terminal end of the second sipe element; and
- a mold segment base that receives the first sipe element and the second sipe element, wherein the female connector of the first sipe element receives the male connector of the second sipe element;
- wherein the female connector is a slot defined in the first sipe element teardrop section, and wherein the male connector is a first leg of the second sipe element, wherein when the female connector of the first sipe element receives the male connector of the second sipe element the first leg is located within the slot;
- wherein a second leg and a third leg of the second sipe element are present, and wherein a pair of the second sipe element teardrop sections are present, wherein the first leg of the second sipe element, the second leg of the second sipe element, and the third leg of the second sipe element are located at the pair of the second sipe element teardrop sections, and wherein the pair of the second sipe element teardrop sections have a length greater than or equal to 70 millimeters.

8. The mold segment as set forth in claim 1, wherein the offset of the first sipe element narrow section from the first terminal end of the first sipe element is 1 millimeter, and wherein the offset of the second sipe element teardrop section from the first terminal end of the second sipe element is 1 millimeter.

9. The mold segment as set forth in claim 1, wherein the first sipe element narrow section and the second sipe element narrow section engage one another when the female connector of the first sipe element receives the male connector of the second sipe element.

10. The mold segment as set forth in claim 1, wherein the first sipe element and the second sipe element are used to form a teardrop longitudinal sipe in a tire.

11. The mold segment as set forth in claim 1, wherein the first sipe element has a first sipe element embedded end that defines a first sipe element void, wherein the first sipe element embedded end is located within the mold segment base when the mold segment base receives the first sipe element;
- wherein the second sipe element has a second sipe element embedded end that defines a second sipe element void, wherein the second sipe element embedded end is located within the mold segment base when the mold segment base receives the second sipe element.

12. The mold segment as set forth in claim 1, wherein the first sipe element has a first sipe element first terminal end and the female connector is located at the first sipe element first terminal end, wherein the first sipe element has a first sipe element second terminal end and the first sipe element narrow section and the first sipe element teardrop section are both located at the first sipe element second terminal end.

* * * * *